Jan. 13, 1959 W. L. VOLLINK 2,868,647
PROCESS OF PRODUCING A CANDY COATED CEREAL
Filed Sept. 24, 1953
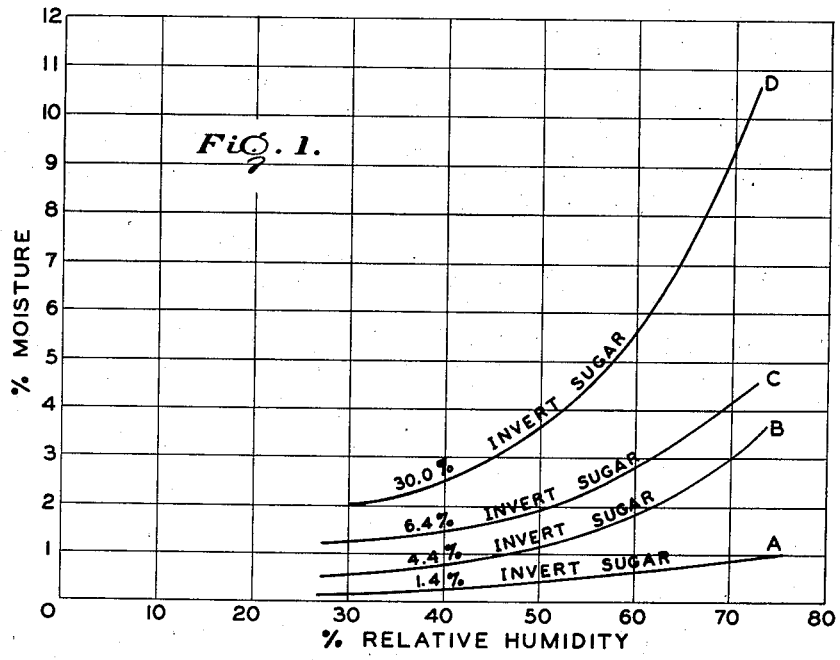
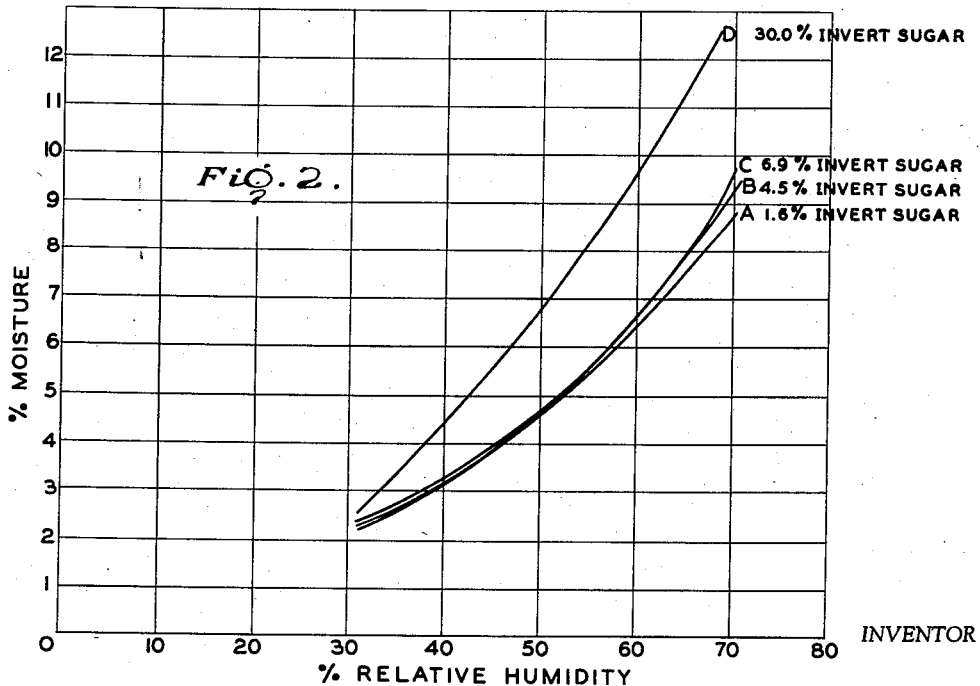
INVENTOR
Willard L. Vollink
BY
Cameron, Kerkam + Sutton
ATTORNEYS nited States Patent Office 2,868,647
Patented Jan. 13, 1959

2,868,647

PROCESS OF PRODUCING A CANDY COATED CEREAL

Willard L. Vollink, Battle Creek, Mich., assignor to General Foods Corporation, New York, N. Y., a corporation of Delaware Application September 24, 1953, Serial No. 382,081

15 Claims. (Cl. 99—83)

The present invention relates to candy coated cereal bodies such as cereal flakes, puffed cereals and other cereal forms, and more particularly to the provision thereon of a hard, transparent or glass-like coating that does not become sticky even under very humid conditions.

Such cereal bodies have been coated heretofore with glazes of the hard candy type, i. e., sugar compositions containing only 2–5% moisture which can be liquified by heating and which solidify on cooling into hard clear glazes. Because of their low moisture content such compositions do not need to be dried, but on the other hand they require the addition of a substantial amount of invert sugar and relatively high temperatures in order to provide the fluidity necessary for application to cereal bodies. Sucrose crystallization is prevented by the invert sugar, but in humid atmospheres such coatings absorb moisture and become very sticky with the result that the cereal bodies agglomerate in the consumer package to an objectionable extent. For humid climates, special moisture-proof packages are employed in an effort to minimize this disadvantage.

It has also been proposed to coat cereal bodies with sugar syrups at about 35% water. These syrups are sufficiently fluid for application without invert sugar, but must then be dried with the result that the sucrose crystallizes during drying and the coating turns white or frosted. This crystallization can continue during storage of the product and result in an undesirable granular feel in the mouth when the product is consumed. For some purposes such frosted coatings have been acceptable, but whenever a clear, transparent glaze has been desired, invert sugar has been employed in the case of syrups, as in the case of hard candies, in order to prevent crystallization. But again the presence of invert sugar has resulted in the same disadvantage, i. e., the coating has become sticky under humid conditions with resultant excessive agglomeration in the package.

It has now been found possible to provide such cereal bodies with a hard, transparent glaze that does not become sticky by the application thereto of a sucrose syrup containing a controlled amount of other sugars, followed by drying to remove excess moisture. The amount of non-sucrose sugars should be within the range of 1–8%, preferably about 5%, on the dry basis. Under these conditions the excess moisture of the syrup can be eliminated by drying without whitening of the coating, and with the unexpected result that the hard, transparent glaze thus formed retains its glaze-like character and does not become sticky even under excessively humid conditions.

The non-sucrose sugars include not only the mixture of levulose and dextrose known as invert sugar but all sugars other than sucrose such as glucose, fructose, arabinose, raffinose, lactose, maltose, and the like. The syrup or sugar solution should preferably contain between 60% and 85% total sugars, including 1–8% of such other sugars, and the remainder practically all sucrose, in which range it is sufficiently fluid at moderate temperatures for spraying or like application but does not contain an undue amount of water to be removed by drying. Syrup containing less than 60% sucrose may be used provided other compatible materials provide a viscosity equivalent to that of a 60% sucrose syrup, so that excessive packing into the cereal body is prevented. At 85% sucrose, on the other hand, difficulty with supersaturation may be encountered.

The cereal bodies which may be coated in accordance with the present invention include all ready-to-eat cereal bodies in flaked, shredded, puffed or other forms, such as corn flakes, bran flakes, wheat flakes, oat flakes, puffed wheat, shredded wheat, puffed rice, puffed corn, breakfast cereals in the form of extruded and puffed doughs, and the like. Such cereal bodies, prepared in the usual manner with or without toasting, comprise the starting materials for the application of candy coatings in the manner hereinafter described.

The syrup is applied to the cereal body in any suitable manner, as by tumbling, spraying, atomizing or combinations thereof. For example, the syrup may simply be poured onto the cereal bodies as they are being tumbled in a horizontal rotating cylinder or the like, the distribution of the syrup being brought about by the cereal bodies tumbling over and in contact with each other. Atomizing or spraying of the syrup is more efficient in many cases, however, particularly with cereal forms such as flakes. Of course, spraying or atomizing can be combined with tumbling if desired.

Generally speaking, the temperature of the syrup at the time of application need only be high enough to provide the flowability or fluidity desired for the selected method of application. In cases of high sucrose concentration and relatively low concentration of other sugars, however, relatively high temperatures are desirable to avoid supersaturation which might cause crystallization and whitening. Thus syrups containing as much as 84% sucrose and as little as 1% other sugars should be handled at temperatures of the order of 235–250° F., but much lower temperatures are permissible when the amount of non-sucrose sugar is increased to about 7%. With syrups containing about 60% sucrose and as little as 1% non-sucrose sugars, on the other hand, no particular control of temperature is necessary but temperatures in the neighborhood of 70°–120° F. are generally preferred for good fluidity.

The sucrose content of the syrup to be preferred in any given case is governed to some extent by the nature of the cereal bodies being coated. In the case of porous cereal bodies such as puffed wheat and other gun puffed products, a syrup of higher concentration is desirable to reduce the amount absorbed into the cereal body before a satisfactory external coating is obtained. Soaking into such porous cereal bodies can be further reduced by the use of thickeners such as dextrins, gums, methyl cellulose, carboxy methyl cellulose, dextran, gelatinized starches such as corn starch, waxy maize starch and tapioca starch (raw starches may also be employed where the conditions of use cause gelatinization), and the like. The amount of thickener to be added to the syrup depends upon the concentration of the syrup, upon the nature of the cereal body and particularly its porosity, and also of course upon the particular thickener employed. Dextrins and corn syrup, for example, may be employed within the range of 0.5–10% (dry basis), above which the coating becomes sticky; whereas gums such as gum arabic, Irish moss, gum tragacanth and the like, and also methyl cellulose and carboxy methyl cellulose, may be employed within the range of 0.2–2%, above which the syrup becomes too viscous for application. With dextran and the gelatinized starches the range is about 0.5–5%, the upper limit again being that at which the coating becomes sticky. Especially good results have been obtained with waxy maize and tapioca starches.

For porous cereal bodies of the types mentioned above, therefore, syrups containing about 75–80% sugars or syrups in which an equivalent viscosity is obtained by using thickeners are preferred. For non-porous cereal bodies, on the other hand, syrups containing about 60–70% sugars are sufficiently viscous without thickeners, but they can be used if desired.

As stated above, the non-sucrose sugar content of the syrup must be within the range of 1–8% on a dry basis, intermediate values of the order of 5% being preferable in most cases. Below 1% there is not a sufficient amount of such sugars to prevent the development of a whitish, opaque, crystalline coating on drying and storage. Above 8%, on the other hand, the coating while transparent and clear is undesirably hygroscopic and becomes objectionably sticky under humid conditions.

The drying conditions to be employed, and particularly the drying temperatures and times required, depend primarily on the nature of the cereal body and the amount of coating thereon, provided of course that inversion taking place during drying does not increase the percentage of non-sucrose sugars above 8%. Most rapid drying takes place with relatively non-porous bodies such as corn flakes, bran flakes, over-puffed rice and the like, which normally carry relatively light coatings amounting to 26–33% by weight of the final product. In such cases circulating air temperatures of the order of 275–300° F. may be employed to dry the product in a matter of 7–8 minutes to a moisture content of 2–3%. More porous cereal bodies and thicker coatings require lower drying temperatures and longer times. For example, gun puffed wheat normally carrying a coating amounting to 45–60% of the final product requires a period of 15–20 minutes at a temperature of 225–250° F. These drying conditions are given by way of example; thicker coatings require still lower drying temperatures and longer drying times. Drying temperatures lower than these specified above may of course be employed if desired, and satisfactory results have been obtained at such lower temperatures using drying periods as long as two hours.

Although inversion begins to take place to a substantial degree at temperatures above about 250° F. and the rate increases rapidly at temperatures above 300° F., the drying times required at these temperatures are short so that the amount of inversion is kept within reasonable limits. Thus at the preferred non-sucrose sugar level of 5%, the higher temperatures and shorter times mentioned above can be used safely without exceeding the limit of 8%. For this reason among others, however, temperatures in excess of about 300° F. are undesirable unless the initial level of non-sucrose sugar is quite low, for example, at or near the lower limit of 1%. At initial levels near the upper limit of 8%, on the other hand, lower temperatures and longer times may have to be used.

The coated cereal bodies should be relatively motionless in the early stages of drying in order to minimize the danger of crystallization and the tendency to develop a whitish, opaque, crystalline coating. It is not essential to eliminate agitation completely, and in certain cases it is preferred to employ some agitation after drying has been about half completed in order to break up agglomerates. But if any substantial part of drying is carried out in a revolving reel, for example, the coating becomes whitish or cloudy.

After drying the coated and still hot cereal bodies need to be cooled to set the coating and prevent agglomeration. Cooling should be carried out rather rapidly to minimize agglomeration. Thereafter the product is packaged and is ready for shipment.

It will be understood, of course, that the coating may contain other constituents such as different flavoring materials including vanilla, honey (which of course furnishes invert sugar) and the like, and also known hardeners such as sodium acetate.

The minimum amount of coating that can be applied to the cereal body and still have the appearance and effect of a coating varies with the porosity of the body itself. In the case of non-porous cereal bodies where most of the applied coating material remains on the surface, the amount required to provide a detachable coating is at least 5% of the final cereal product. In other words, the final product should contain a minimum of about 5% sugars contributed by the applied coating material, in addition to sugars naturally present in the cereal or introduced by processing prior to coating such as cooking the cereal in syrups or other sugar solutions. Similarly a minimum of 10–15% is usually necessary in order for the coating to be continuous which is, of course, preferred. To obtain a substantially continuous coating in the case of porous cereal bodies such as the aforementioned gun puffed wheat and rice, the amount of applied material must be increased to about 25% or more to allow for the greater amount of absorption of the syrup by the cereal body. Absorption can, however, be minimized by adding thickeners as stated above.

The maximum amount of coating that may be applied to the cereal bodies is limited by quite different factors. In the case of non-porous, non-spherical or more or less flat cereal bodies such as flakes, agglomeration becomes excessive at about 30–35% applied coating. With the relatively smooth rounded or spherical bodies, on the other hand, the tendency toward agglomeration is much less, but higher amounts of coating require longer drying periods and sucrose crystallization begins to occur before the coating can be dried. This latter factor is also influenced by porosity which, in the absence of thickeners, permits the syrup to soak into the cereal body and thus prolongs the drying period. Thus the greatest amount of coating that can be applied satisfactorily is about 55–60% by weight of the final product.

The curves of Figs. 1 and 2 illustrate the advantages of coatings embodying the present invention as compared with a coating typical of those heretofore employed. Curves A, B, C and D of Fig. 1 show the moisture pickups for coatings of different invert sugar content at various relative humidities. These data were obtained by applying the different syrups to a flat surface of stainless steel, drying them and scraping the coatings from the metal surface, depositing these removed coatings in Petri dishes and subjecting them to controlled relative humidities long enough to establish equilibrium conditions. Curves A, B, and C show that at a relative humidity of 50%, for example, coatings embodying the present invention and having respective invert sugar contents of 1.4%, 4.4%, and 6.4% are in equilibrium at moisture contents of about 0.4%, 1.1% and 1.9% respectively; whereas curve D shows that under the same conditions, a prior coating containing 30.0% invert sugar is in equilibrum at 3.6% moisture content. At 70% relative humidity the comparison is even more striking, the equilibrium moisture contents being 0.9%, 3.0%, 4.1% and 9.4%, respectively. Thus candy coatings embodying the present invention pick up and hold substantially less moisture than prior high invert sugar coatings when subjected to the same relative humidity.

As stated above, however, one of the chief advantages of coatings embodying the present invention is that they do not become sticky and the packaged product does not agglomerate even under very humid conditions. This property is of great practical importance, as can be seen from Fig. 2 demonstrating a very important and completely unsuspected difference between cereals having the low invert sugar coatings of the present invention and those with high invert sugar coatings heretofore employed. As shown by curves A, B and C, corn flakes having coatings embodying the present invention have substantially the same moisture equilibrium curves, the difference shown in Fig. 1 between curves A, B and C not being evident in Fig. 2 because the moisture content of the coating per se (Fig. 1) is only a part of the total moisture content of the cereal body and its coating (Fig. 2). For the same reason, the differences between curves A, B and C and curve D are not as marked in Fig. 2 as in Fig. 1.

It is known from experience, however, that corn flakes coated with the high invert sugar coating (curve D) become sticky with resultant agglomeration or caking of the packaged product when the total moisture content reaches about 3.5%, the equilibrium level at 35% R. H. But since the low invert sugar coatings of curves A, B and C do not become sticky, the maximum moisture level of these coated cereal bodies is determined by an entirely different factor, namely, the level at which they become unpalatable due to sogginess. In the case of corn flakes, this occurs at about 5.5% moisture which is shown by Fig. 2 to be in equilibrium with about 55% R. H.

Thus, the high invert sugar coating such as illustrated in curve D of Fig. 2 cannot remain long at a relative humidity as low as 35% without agglomeration which causes the product to be unacceptable (i. e., in the absence of special moisture vaporproof packages). On the contrary, products embodying the present invention do not agglomerate and can be subjected to much higher humidities without becoming unacceptably soggy. Even if temporary sogginess should occur under unusual conditions, moreover, the product will have an opportunity to dry out and to become acceptacle once again as soon as a lower R. H. prevails, whereas an agglomerated or caked mass cannot be broken up or disintegrated without considerable damage to the individual cereal bodies.

Example I 13 pounds of water and 26 pounds of sugar are combined and heated gradually up to a temperature of about 180° F. at which the sugar is completely dissolved, after which 0.75 pound of honey, 0.08 pound of salt, and 0.01 pound of sodium acetate are dissolved in the syrup and the syrup is then cooled to room temperature. 39.84 pounds of this syrup are sprayed onto 72 pounds of corn flakes in about 5 minutes while agitating the corn flakes, after which the coated flakes are deposited on a screen, preferably a horizontally traveling screen, and hot air at about 275°–300° F. is blown through the bed in order to dry the coating on the flakes. The initial moisture content of the flakes (usually about 2%) is increased by the addition of the coating material to about 7–8%, but after 7–8 minutes of drying is reduced back approximately to its original 2%. The dried flakes are vibrated briefly to break up agglomerates and then cooled by blowing dry air at about room temperature through the bed.

The product obtained by the foregoing procedure comprises substantially undamaged individual flakes each having a practically continuous coating of clear, transparent glaze which is hard and non-sticky and which does not become sticky even when held under very humid conditions. The final product contains about 27.5% of materials contributed by the applied coating, and 72.5% corn flakes. The composition of this product (dry basis) was as follows:

| | Percent non-sucrose sugars | Percent total sugars |
|---|---|---|
| Corn flakes per se | 3.5 | 8.8 |
| Candy coating per se | 2.1 | 98.0 |
| Finished product | 3.1 | 33.3 |

This product is packaged in an ordinary cardboard cereal carton having a wax paper liner and a wax paper over-wrap. It is not necessary to employ special and expensive moisture vapor proofing materials such as the aluminum foil-laminated praper which has been employed heretofore as a first over-wrap for the package with the aforementioned wax paper as a second over-wrap.

Example II 50 pounds of sugar are dissolved in 25 pounds of water and heated to about 180° F., after which 3 pounds of corn dextrine, 1.2 pounds of honey, 0.2 pound of salt and 0.02 pound of sodium acetate are added. This syrup is heated to a temperature of about 225°–230° F. and preferably sprayed onto about 44 pounds of gun puffed wheat tumbling in a revolving reel, although if desired the syrup may simply be poured onto the wheat puffs since tumbling will distribute the coating. The coated cereal bodies are deposited in a moderately thick bed (4–6 inches thick) on a traveling screen and dried for about 20–30 minutes with hot air at a temperature of about 200°–225° F., the hot air being blown up through the screen. After the first 5–7 minutes of drying the coated cereal bodies are vibrated for a few seconds to break up agglomerates, after which the thickness of the bed may be increased up to 14–18 inches. After being dried down to about 2% moisture, the coated puffs are again separated and graded on a vibrating screen and then cooled by blasting with room temperature air and packaged as described in Example I. The final product contains about 56% by weight of materials contributed by the applied coating, and about 44% wheat puffs. Its composition (dry basis) was as follows:

| | Percent Invert Sugar | Percent Total Sugars |
|---|---|---|
| Puffs per se | 1.0 | 2.2 |
| Candy coating per se | 1.8 | 94.0 |
| Finished product | 1.4 | 53.6 |

It will be understood that the details set forth above are by way of example only and that various modifications within the spirit of the invention will occur to those skilled in the art. Accordingly reference should be had to the appended claims for a definition of the limits of the invention.

What is claimed is:

1. A process for covering cereal bodies with a hard glaze-like coating that does not become sticky when exposed to high relative humidity, comprising the steps of forming an aqueous sugar syrup containing between 60% and 85% soluble solids which consist essentially of sucrose and from 1% to 8% non-sucrose sugar on a dry solids basis, distributing said syrup over the surfaces of the cereal bodies, and then drying the syrup-coated cereal bodies, initially without substantial agitation of said bodies, to a final moisture content of 2–3% at a temperature and time such that the amount of invert sugar formed during drying does not increase the level of non-sucrose sugars in the coating above 8% on a dry solids basis.

2. A process as defined in claim 1, said coated bodies being dried at a temperature not appreciably greater than 300° F., the drying time varying inversely with the temperature.

3. A process as defined in claim 2, the coating applied to said cereal bodies comprising between 10% and 60% of the weight of the product on the dry basis.

4. A process as defined in claim 3, said syrup containing a thickener to increase its viscosity.

5. A process for covering non-porous cereal bodies with a hard glaze-like coating that does not become sticky when exposed to high relative humidity, comprising the steps of forming an aqueous sugar syrup containing about 60–70% soluble solids which consist essentially of sucrose and from 1% to 8% of non-sucrose sugars on a dry solids basis, distributing said syrup over the surfaces of the cereal bodies, and then drying the syrup-coated cereal bodies, initially without substantial agitation of said bodies, to a final moisture content of 2–3% at a temperature and time such that the amount of invert sugar formed during drying does not increase the level of non-sucrose sugars in the coating above 8% on a dry solids basis.

6. A process as defined in claim 5, the coating applied to said cereal bodies comprising between about 10% and 35% of the weight of the product on the dry basis.

7. A process as defined in claim 6, said syrup-coated bodies being dried at a temperature in the approximate range of 275°–300° F. and for a period of about 7–8 minutes.

8. A process as defined in claim 7, the initial level of non-sucrose sugars in said syrup being about 5%.

9. A process for covering porous cereal bodies with a hard glaze-like coating that does not become sticky when exposed to high relative humidity, comprising the steps of forming an aqueous sugar syrup containing about 70–80% soluble solids which consist essentially of sucrose and from 1% to 8% of non-sucrose sugars on a dry solids basis, distributing said syrup over the surfaces of the cereal bodies, and then drying the syrup-coated cereal bodies, initially without substantial agitation of said bodies, to a final moisture content of 2–3% at a temperature and time such that the amount of invert sugar formed during drying does not increase the level of non-sucrose sugars in the coating above 8% on a dry solids basis.

10. A process as defined in claim 9, the coating applied to said cereal bodies comprising between about 25% and 60% of the weight of the product on a dry basis.

11. A process for covering porous cereal bodies with a hard glaze-like coating that does not become sticky when exposed to high relative humidity, comprising the steps of forming an aqueous sugar syrup containing a thickener to provide a viscosity equal to that of a 70–85% sucrose syrup, and sugars including from 1% to 8% non-sucrose sugars on a dry solids basis, distributing said syrup over the surfaces of the cereal bodies, and then drying the syrup-coated cereal bodies, initially without substantial agitation of said bodies, to a final moisture content of 2–3% at a temperature and time such that amount of invert sugar formed during drying does not increase the level of non-sucrose sugars in the coating above 8% on a dry solids basis.

12. A process as defined in claim 11, the coating applied to said cereal bodies comprising between about 25% and 60% by weight of the product on a dry basis.

13. A process as defined in claim 12, said coated bodies being dried at a temperature in the approximate range of 225°–250° F. for about 15–20 minutes.

14. A process as defined in claim 13, the initial level of non-sucrose sugars in said syrup being about 5%.

15. A process as defined in claim 1, the drying time varying inversely with the temperature in the approximate proportions corresponding to 7–8 minutes in circulating air at 300° F. and 15–20 minutes in circulating air at 225° F.

References Cited in the file of this patent

UNITED STATES PATENTS

| | | |
|---|---|---|
| 1,175,407 | Bright | Mar. 14, 1916 |
| 2,106,762 | Robinson et al. | Feb. 1, 1938 |
| 2,196,395 | Kellogg | Apr. 9, 1940 |
| 2,333,442 | Rex | Nov. 2, 1943 |
| 2,689,796 | Massmann et al. | Sept. 21, 1954 |